United States Patent
Hung

(10) Patent No.: US 7,513,568 B2
(45) Date of Patent: Apr. 7, 2009

(54) BICYCLE SADDLE ASSEMBLY

(75) Inventor: Chun-Fu Hung, Taichung County (TW)

(73) Assignee: Velo Enterprise Co., Ltd. (TW)

( * ) Notice: Subject to any disclaimer, the term of this patent is extended or adjusted under 35 U.S.C. 154(b) by 0 days.

(21) Appl. No.: 11/730,825

(22) Filed: Apr. 4, 2007

(65) Prior Publication Data

US 2008/0246314 A1 Oct. 9, 2008

(51) Int. Cl.
*B60N 2/38* (2006.01)
(52) U.S. Cl. ................ 297/195.1; 297/199; 297/200
(58) Field of Classification Search ............. 297/200, 297/199, 195.1
See application file for complete search history.

(56) References Cited

U.S. PATENT DOCUMENTS

| | | | | |
|---|---|---|---|---|
| 477,122 | A * | 6/1892 | Johnson | 297/200 |
| 503,236 | A * | 8/1893 | Guthrie et al. | 297/199 |
| 514,748 | A * | 2/1894 | Decker | 297/199 |
| 3,558,187 | A * | 1/1971 | Morse | 297/199 |
| 5,775,710 | A * | 7/1998 | Yu | 280/283 |
| 6,343,836 | B1 | 2/2002 | Yu | |
| 6,860,551 | B1 * | 3/2005 | Chi | 297/200 |
| 7,059,673 | B1 | 6/2006 | Lee | |
| 7,093,894 | B2 * | 8/2006 | Yu | 297/200 |
| 2005/0029842 | A1 * | 2/2005 | Martin et al. | 297/199 |

OTHER PUBLICATIONS

European Search Report dated Jul. 17, 2007.

* cited by examiner

*Primary Examiner*—Laurie K Cranmer
(74) *Attorney, Agent, or Firm*—Browdy and Neimark, P.L.L.C.

(57) ABSTRACT

A bicycle saddle assembly includes a seat body, a supporting rail and a suspension means. The seat body includes a front portion and a rear portion being wider than the front portion. The seat body further includes a longitudinal axis dividing the seat body into two symmetrical portions, and a pressure receiving center located on the rear portion of the seat body and passed through by said longitudinal axis. The supporting rail has a first rear end engaged on the underside of the front portion of the seat body, a second and front rear ends respectively extending from the front end along the longitudinal axis of the seat body. The suspension means is disposed exactly under the pressure receiving center of the seat body and coupled with the first and second rear ends of the suspension rail.

9 Claims, 6 Drawing Sheets

BICYCLE SADDLE ASSEMBLY

BACKGROUND OF THE INVENTION

1. Field of the Invention

The present invention generally relates to bicycle saddles, particularly to a bicycle saddle with a suspension means appropriately positioned and constructed to be lightweight and to absorb shock and damp vibration effectively, omnidirectionally and evenly during bicycle riding.

2. Description of the Related Art

It is well known that sprung bicycle saddles had been developed to absorb shock produced during riding. These saddles typically include a seat body and a pair of coil-spring suspension means arranged respectively on the underside of the seat body to attenuate the shock load. However, such arranged coil-spring suspension means can only absorb shock coming from unidirection. In other words, such arranged coil-spring suspension means can not absorb shock coming from omnidirection. In addition, for having a complicated structure, sprung saddles are too heavy to be suitable for regular bicycles, not practical for racing bicycles or mountain bikes.

To solve the disadvantages of the conventional sprung bicycle saddles, US patent application under the publication No. US-2005-0029842-A1 discloses an improved saddle assembly including a seat body and a single pneumatic suspension positioned on the bottom of the seat body. However, the patent application did not teach how to size and position the pneumatic suspension to have a bicycle saddle assembly being lightweight and capable absorbing shock and damping vibration effectively, omnidirectionally and evenly.

Accordingly, an improved bicycle saddle assembly provided a suspension means appropriately constructed and positioned to be lightweight and to absorb shock and damp vibration effectively, omnidirectionally and evenly is desired.

SUMMARY OF THE INVENTION

Therefore, according to one aspect of the present invention, a bicycle saddle assembly comprises a seat body, a supporting rail, and a suspension means. The seat body includes a relatively narrow anterior portion which fits between a bicycle rider's crotch, and a relatively wider posterior portion for supporting a bicycle rider's buttocks. The seat body further includes a longitudinal axis dividing the seat body into two symmetrical portions, and a pressure receiving center located on the wider posterior portion and passed through by the longitudinal axis.

The suspension rail is used to mount the seat body to a bicycle, which has a front end, a first rear end, and a second rear end. The front end of the rail is engaged on the underside of the anterior portion of the seat body. The first and second rear ends of the rail extend along the longitudinal axis of the seat body from the front end of the rail to an area placed under the wider posterior portion of the seat body.

The suspension means is provided to absorb shock and damp vibration transferred from a bicycle body during riding. The suspension means is exactly disposed under the pressure receiving center of the seat body and coupled with the first and second rear ends of the suspension rail.

According to another aspect of this invention, the pressure receiving center of the seat body is positioned in such a way that the distance between the pressure receiving center and the exactly rear end of said seat body is about one half to one fifth of the length of the seat body measured from the exactly front end thereof to the exactly rear end thereof.

In one embodiment of this invention, the suspension means comprises a first positioning base, a resilient and deformable member and a positioning strut. The first positioning base connects to the first and second rear ends of the suspension rail in such a way that a space is formed between the underside of the wider posterior portion of the seat body and the first positioning base. A resilient and deformable member having a predetermined thickness and a center opening is located on the space. A positioning strut downwardly extends from the pressure receiving center of the seat body. The strut passes through the center opening of the resilient and deformable member and is coupled with the first positioning base in such a way that the seat body can be slidable relative to the first positioning base.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE INVENTION

Figure 1:
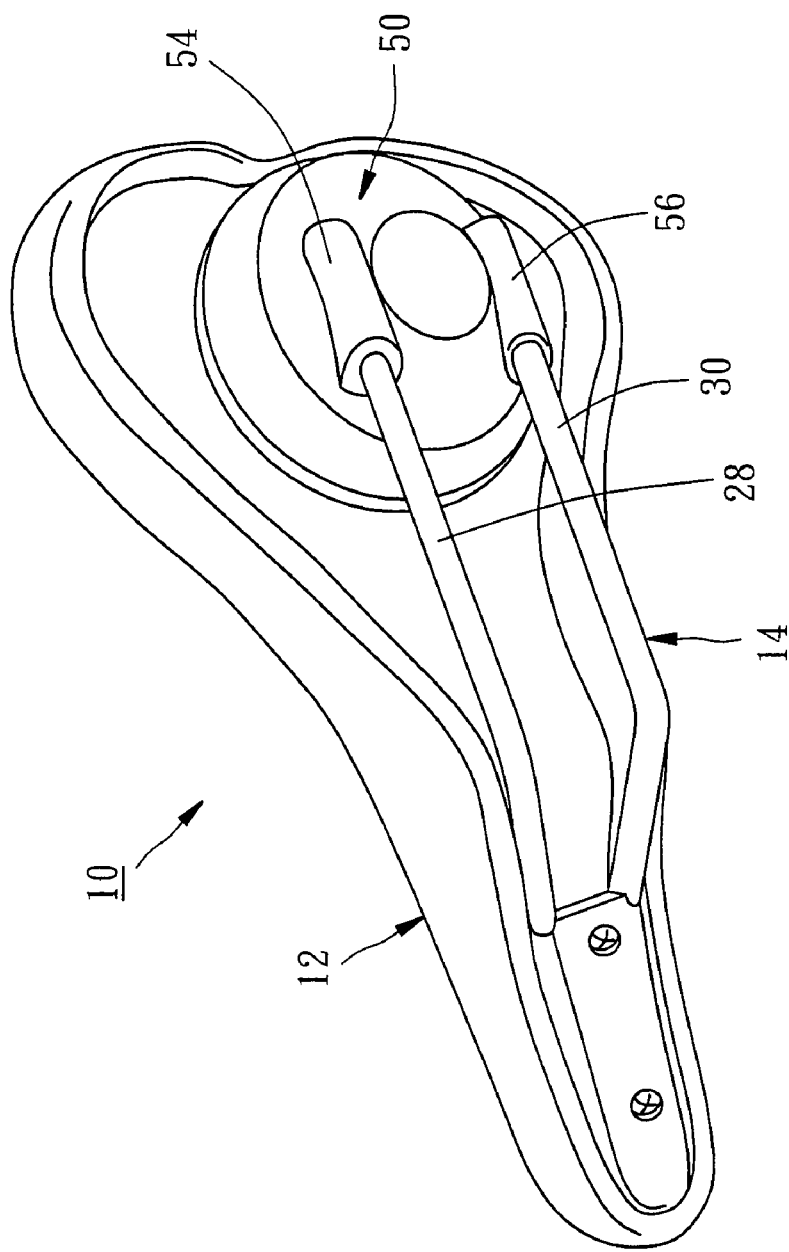
FIG. 1 is a perspective view of an embodiment of the present invention.
Figure 2:
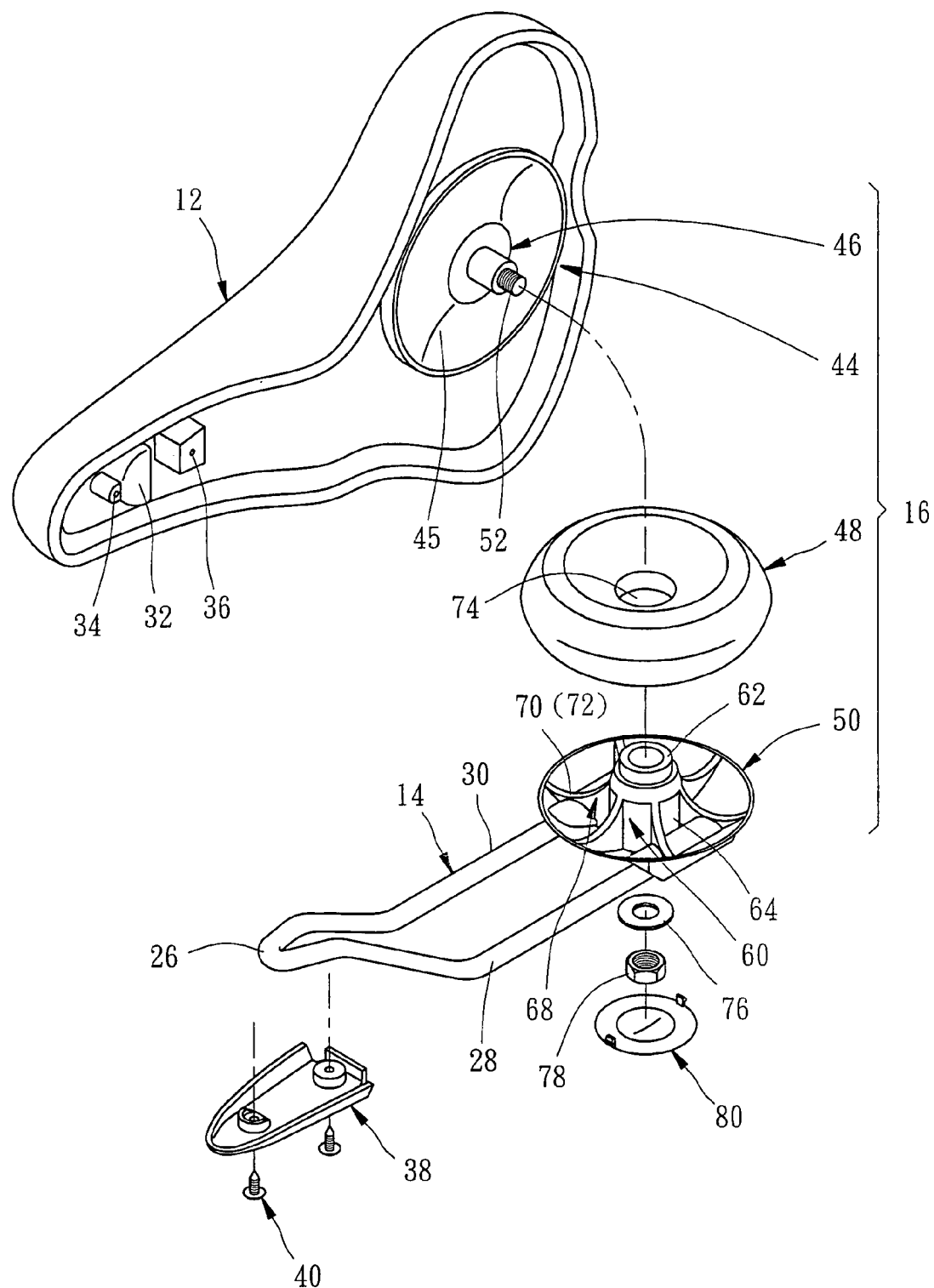
FIG. 2 is an exploded view of the embodiment of FIG. 1.
Figure 3:
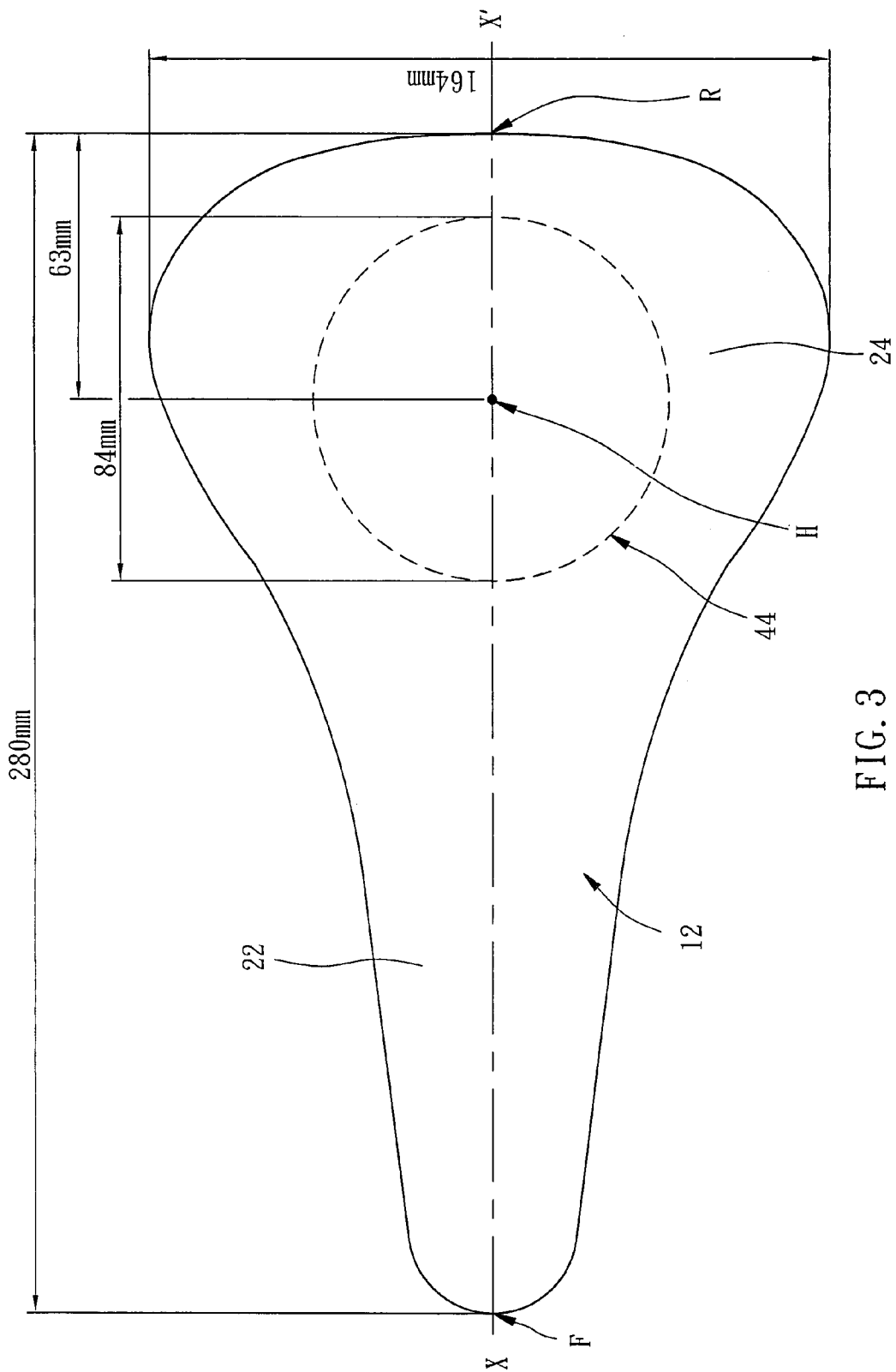
FIG. 3 is a top view of the embodiment of FIG. 1.
Figure 4:
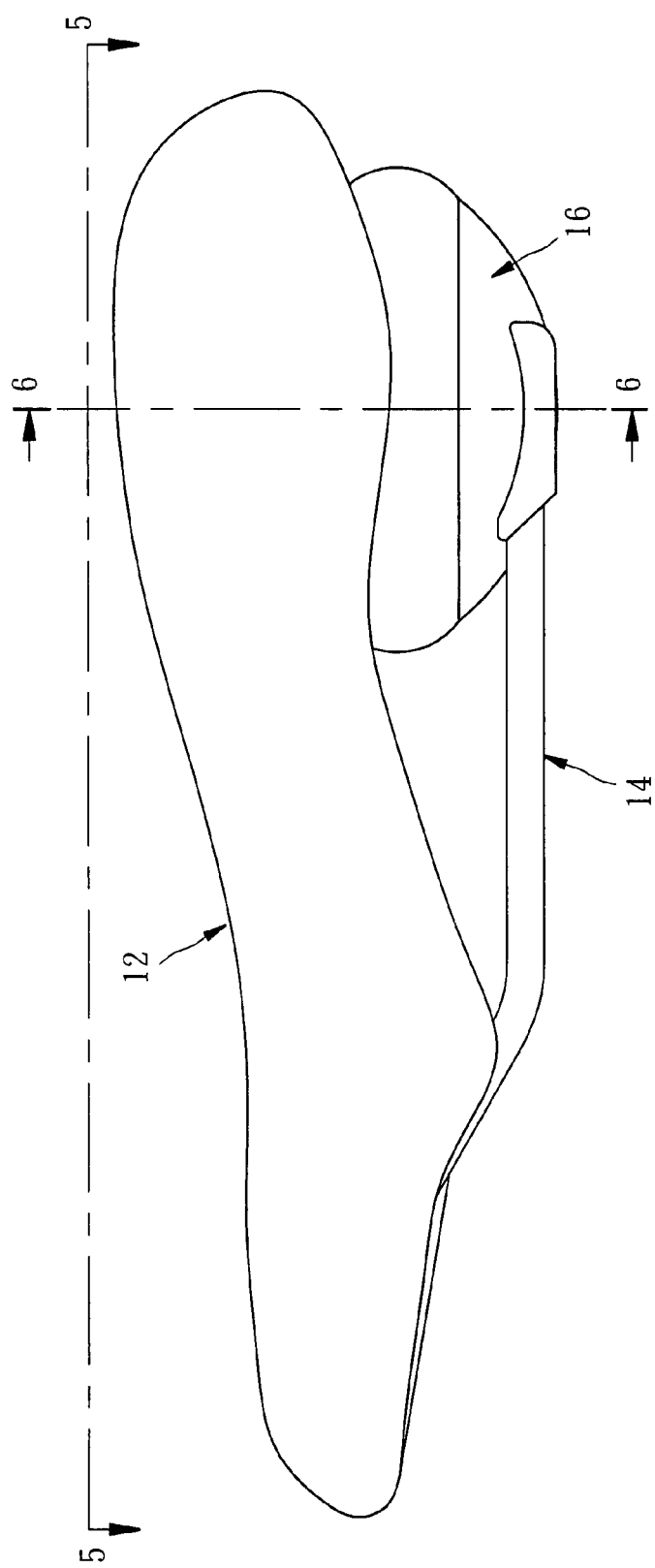
FIG. 4 is a side view of the embodiment of FIG. 1.

Referring to the drawings, there are shown a bicycle saddle assembly 10 including a seat body 12, a supporting rail 14 for mounting seat body 12 onto a bicycle, and a suspension means 16 for damping vibration and absorbing shock produced during bicycle riding.

Figure 5:
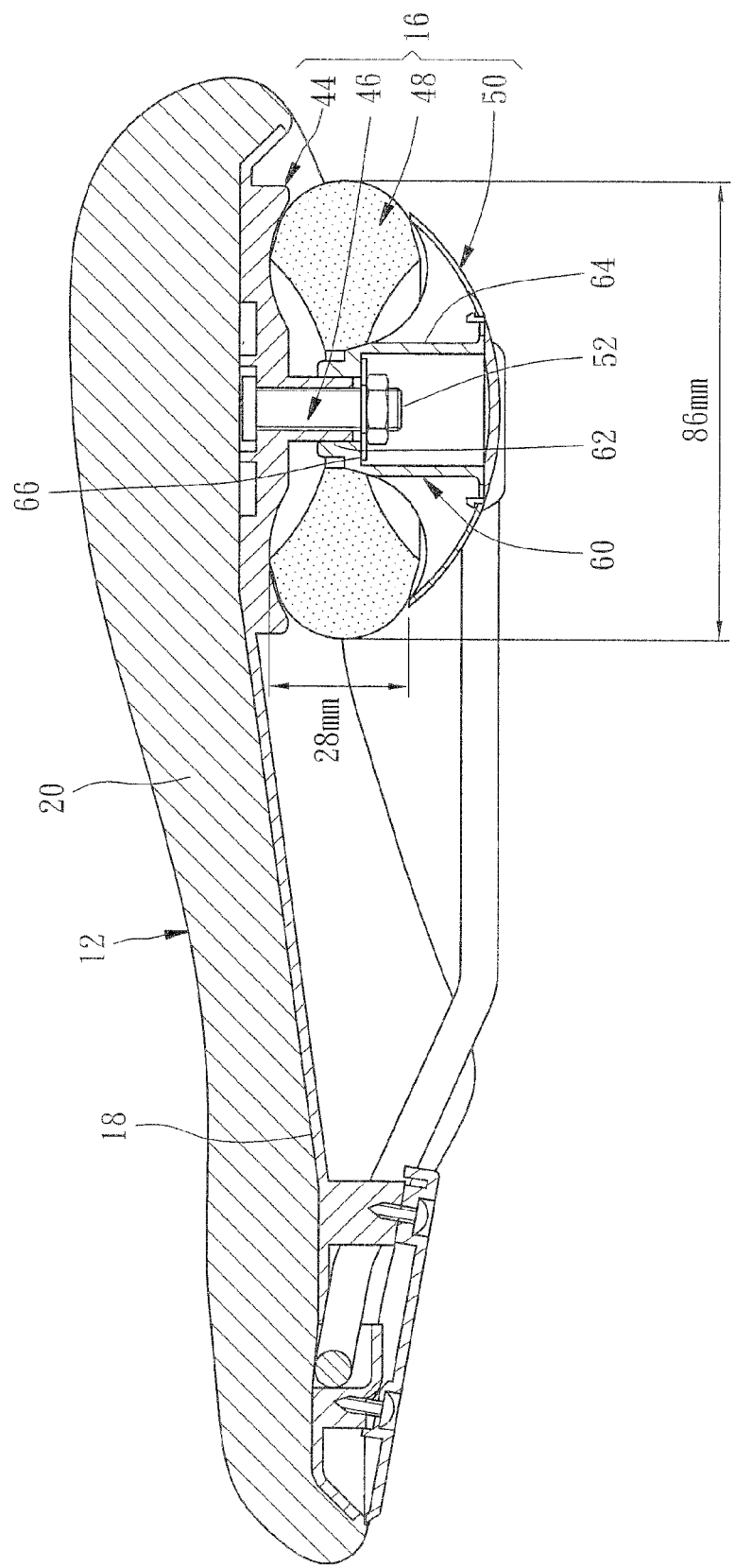
FIG. 5 is a cross-sectional view taken along line 5-5 of FIG. 3.
Figure 6:
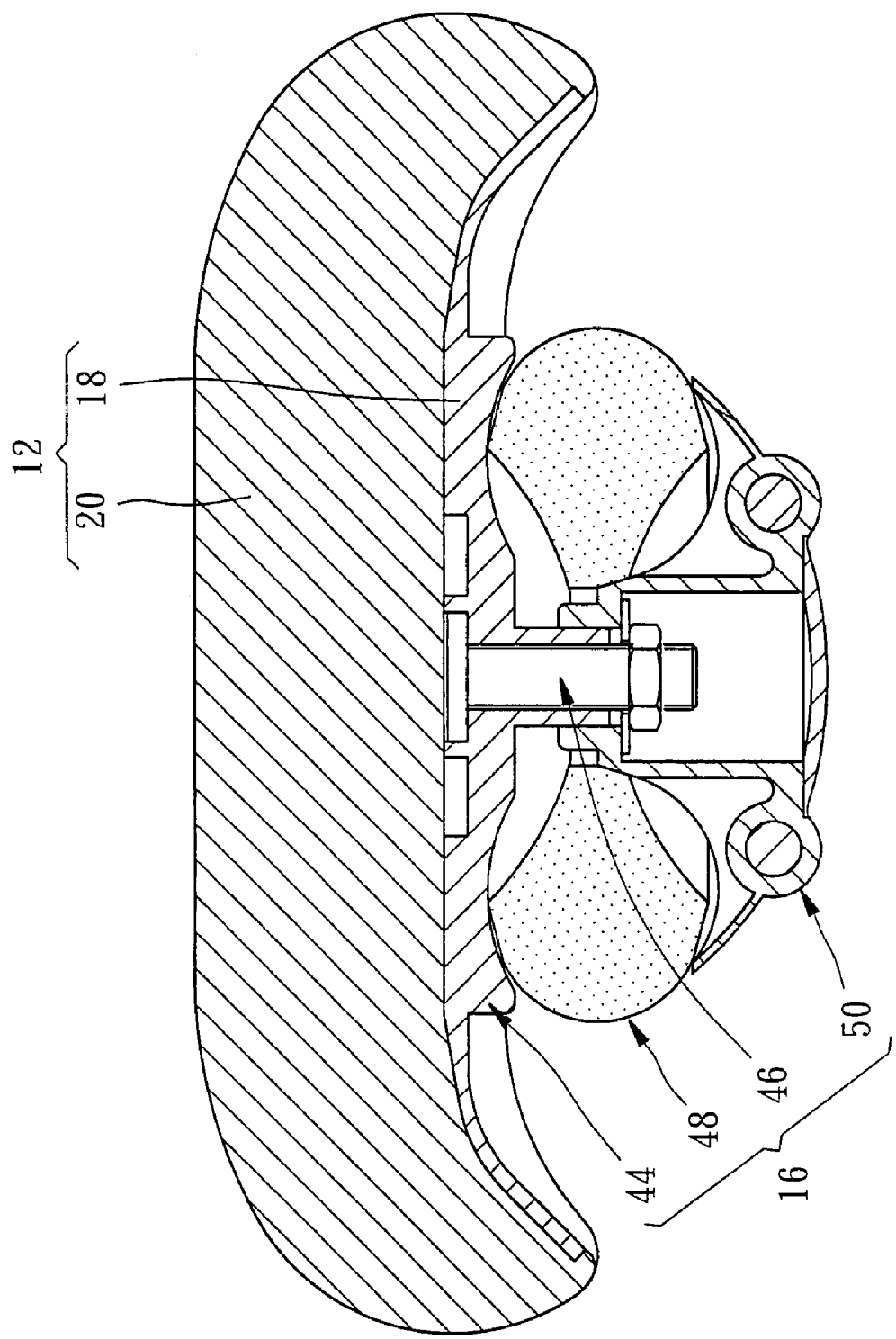
FIG. 6 is a cross-sectional view taken along line 6-6 of FIG. 4.

The seat body 12 includes a shell 18 and a padding 20 covering the shell 18 (as shown in FIG. 5). The shell 18 is made of a relatively stiff, yet slightly flexible, plastic material. The shell 18 is shaped to have a relatively narrow anterior portion 22, which becomes progressively narrower towards its front end to fit between a bicycle rider's crotch, a relatively wide posterior portion 24 for supporting a bicycle rider's buttocks, a longitudinal axis X-X' to divide the seat body 12 into two symmetrical portions, and a pressure receiving center H located on the wider posterior portion 24 and passed through by the longitudinal axis X-X'.

In this embodiment, the length of the seat body 12 measured from the terminal front end F to the terminal rear end R is about 280 mm. The distance between the pressure receiving center H and the exactly rear end R of the seat body is about 63 mm which about equals to one fifth of the length of the shell 18.

The padding 20 is made of a plastic foam material and covers the entire seating surface of the shell 18. The padding 20 may be further covered with leather or other suitable material.

The supporting rail 14 is made of any suitable material, but preferably a lightweight metal. It has a U-shape front end 26, a first rear end 28, and a second rear end 30. The first rear end 28 and second rear end 30 extends respectively from the front end 26 along the longitudinal axis X-X' to an area under the wider posterior portion 24. The front end 26 of the rail 14 is attached to the shell 18 by an anterior coupling means underneath the anterior portion 22 of the seat body 12. Several methods may be employed to attach the closed end 26 of the rail 14 to the anterior portion 22 of the seat body 12. In this embodiment, as shown in the drawings, the anterior coupling means may comprise a socket 32, a first and second positioning piece 34'36, which are molded directly into the shell 18. The anterior coupling means further comprises a cover plate 38 covering the front end 26 of the rail 14 and a pair of screws 40 that extend through the cover plate 38 and engage threadedly with the positioning pieces 34-36 so as to attach the front end 26 of the rail 14 to the shell 18.

The suspension means 16 includes an upper positioning base 44, a positioning strut 46, a resilient and deformable member 48 and a bottom positioning base 50.

The upper positioning base 44, in this embodiment, is molded directly into the underside of the shell 18. The base 44 is disk-shaped with a diameter about 84 mm which about equals to one half of the width of the widest area of the shell 18. The center of the base 44 is located at the pressure receiving center H. The under surface of the upper base 44 defines a first annular depression 45.

The positioning strut 46 is disposed on the center of the upper positioning base 44 and has a threaded free end 52 downwardly extending from the center of the upper positioning base 44.

The bottom positioning base 50 is sized as the upper positioning base 44. The base 50 has a first and second rear sockets 54, 56 (as shown in FIG. 1) located on the bottom side thereof to receive the first and second rear ends 28, 30 of the rail 14. The base 50 further has a hollow central post 60 formed as a unit with base 50 and having a through hole extending from the upper surface thereof the entire length of the post and through base 50. The hollow central post 60 has a first portion 62 and a second portion 64. The diameter of the first portion 62 is smaller than that of the second portion 64 so as to form an annular shoulder 66 therebetween. The surface of the base 50 has six ribs 68 disposed in equidistance. Each of the ribs 68 extends from the outward wall of the post 60 to the edge of the base 50 and has a cured upper end 70 so as to form a second annular depression 72 on the upper surface of the base 50.

The resilient and deformable member 48 can be a ring made of plastic materials or a pneumatic member and have a diameter about equal to one half of the width of the widest area of the seat body 12. In this embodiment, the resilient and deformable member 48 is a rubber ring with a central hole 74, a maximum thickness about 28 mm, and a diameter about 86 mm.

When constructing, the resilient and deformable member 48 is received between the first annular depression 45 of the upper base 44 and the second annular depression 72 of the bottom base 50 such that the hollow central post 60 can run through the central hole 74 of the device 48 and the positioning strut 46 then passes through the hollow central post 60 and is captured by a washer 76 and a nut 78. In this embodiment, the washer 76 is leaned against the annular shoulder 66. The nut 78 is threadedly engaged with the threaded end 52 of the positioning strut 46. And then a bottom cover 80 covers the bottom end of the hollow central post 60.

Whereby, as shown in FIG. 5, the supporting rail 14 attached to a bicycle body, the strut 46 is slidable relative to post 60 on the bottom positioning base 50 at the pressure receiving center H so that the shock and/or vibration transferring from any direction during bicycle riding can be mostly absorbed by the resilient and deformable member 48.

Furthermore, for the resilient and deformable member 48 being sized to have a diameter about equal to one half of the width of the widest area of the shell 18 and received between the upper and bottom position bases 44-50, the shock and the vibration transferring from a bicycle body during riding can be effectively, evenly and omnidirectionally absorbed and damped.

What is claimed is:

1. A bicycle saddle assembly comprising:
   a seat body including an anterior portion which fits between a bicycle rider's crotch and posterior portion for supporting a bicycle rider's buttocks wider than that of the anterior portion, said seat body having a longitudinal axis which divides said seat body into two symmetrical portions, and a pressure receiving center located on said wider posterior portion and on said longitudinal axis;
   wherein a distance between said pressure receiving center and a rear end of said seat body is one half to one fifth of the length of said seat body measured from a front end of said seat body to the rear end;
   a supporting rail for mounting said seat body to a bicycle, said rail having a first rear member, a second rear member, and a front member, said front member being engaged on the underside of said anterior portion of said seat body, said first and second rear members extending from said front member along the longitudinal axis of said seat body to an area under said wider posterior portion;
   a single suspension means to absorb shock and damp vibration transferred from a bicycle body during riding, said suspension means disposed under said pressure receiving center of said seat body and engaged between ends of said first and second rear members of said suspension rail;
   said suspension means having;
   a first positioning base connecting to said first and second rear members of said suspension rail forming a space between the underside of said wider posterior position of said seat body and said first positioning base, wherein a central hollow post formed as a unit with said first positioning base extends up from a bottom of said first positioning base;
   wherein said central hollow post has a through hole and an axis along the entire length thereof and an annular shoulder on a free end thereof;
   wherein the diameter of the through hole passing through the annular shoulder is smaller than that of the through hole below the annular shoulder;
   a resilient and deformable member having a predetermined thickness and a center opening, said resilient and deformable member being located in said space; and
   a positioning strut with an axis extending down from said pressure receiving center of said wider posterior portion so that a free end of said positioning strut extends into and ends within said center opening of said resilient and deformable member and is slidable relative to said annular shoulder in operation so that said seat body moves down relative to the said first position base;
   wherein the axis of the central hollow post and the positioning strut are coaxial and pass through the pressure receiving center on the longitudinal axis of the seat body;
   wherein the free end of said positioning strut is engaged to an underside of said annular shoulder within the through hole of the central hollow post which extends through said first positioning base on which said post is formed as a unit; and
   wherein a cover on a bottom side of said first positioning base closes said through hole.

2. The bicycle saddle assembly as claimed in claim 1, wherein said resilient and deformable member is ring-shaped.

3. The bicycle saddle assembly as claimed in claim 2, wherein said resilient and deformable member has a diameter equal to one half of the width of the widest area of said seat body.

4. The bicycle saddle assembly as claimed in claim 1, wherein said suspension means further comprises a second positioning base disposed on the underside of said wider posterior portion of said seat body such that said resilient and deformable member can be engaged between said first positioning base and second positioning base.

5. The bicycle saddle assembly as claimed in claim 4, wherein said first and second positioning bases are disk-shaped.

6. The bicycle saddle assembly as claimed in claim 5, wherein said second positioning base has a surface with an upper annular depression.

7. The bicycle saddle assembly as claimed in claim 6, wherein said first positioning base further has an upper surface with a bottom annular depression to cooperate with said upper annular depression of said second positioning base to receive said resilient and deformable member.

8. The bicycle saddle assembly as claimed in claim 7, wherein said first positioning base further has a plurality of ribs spaced apart on an upper surface thereof, each of said ribs having a curve-shaped free end to define said bottom annular depression of said upper surface of said first positioning base.

9. The bicycle saddle assembly as claimed in claim 4, wherein said second positioning base is formed directly on the underside of said wider posterior portion of said seat body and has a center located on said pressure receiving center of said seat body.

* * * * *